Nov. 3, 1931.　　　　C. H. LOGUE　　　　1,830,744
VARIABLE SPEED POWER TRANSMITTING MECHANISM
Filed Dec. 5, 1928　　　2 Sheets-Sheet 1
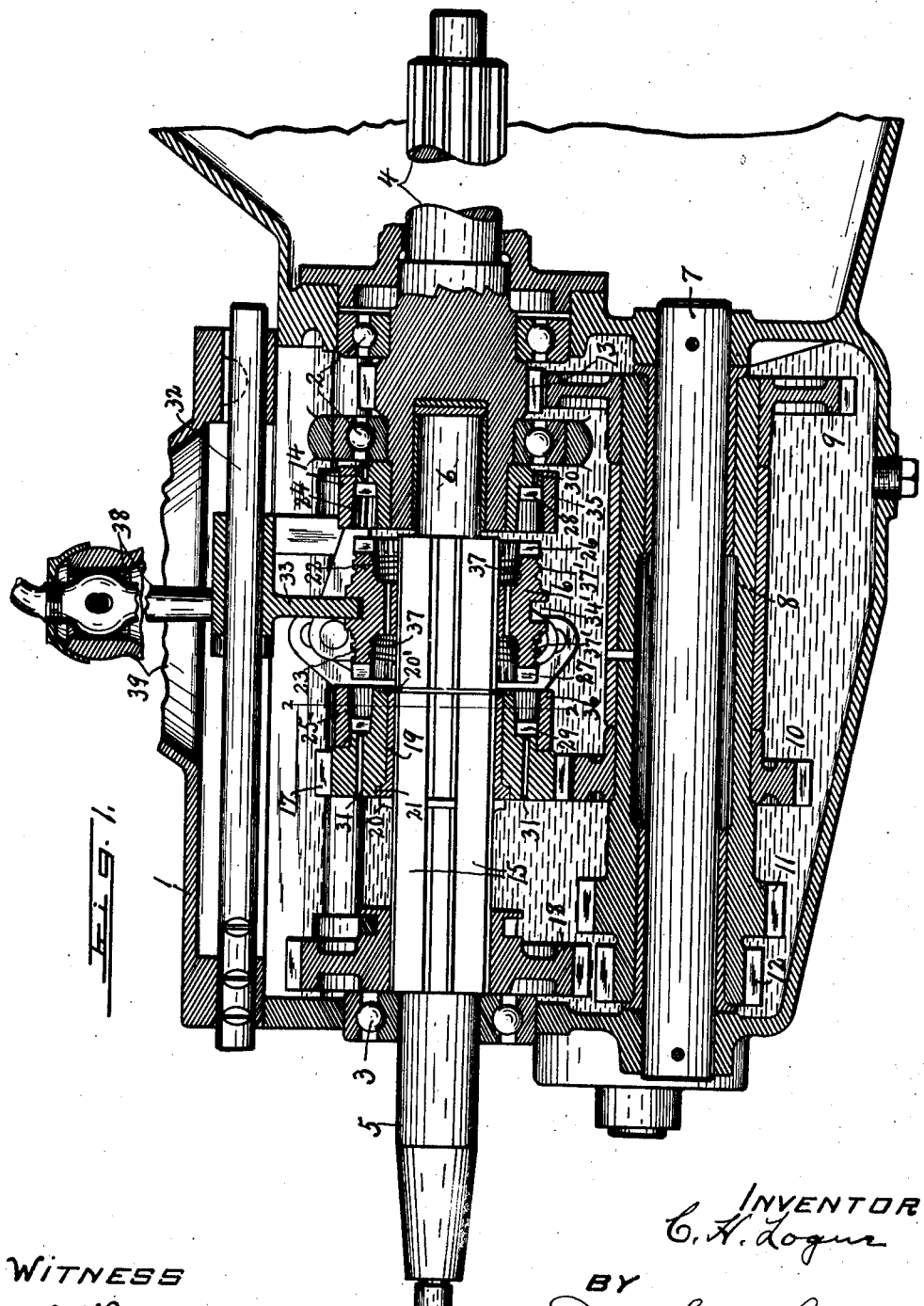
WITNESS
INVENTOR
C. H. Logue
BY
ATTORNEYS Nov. 3, 1931.     C. H. LOGUE     1,830,744
VARIABLE SPEED POWER TRANSMITTING MECHANISM
Filed Dec. 5, 1928     2 Sheets-Sheet 2
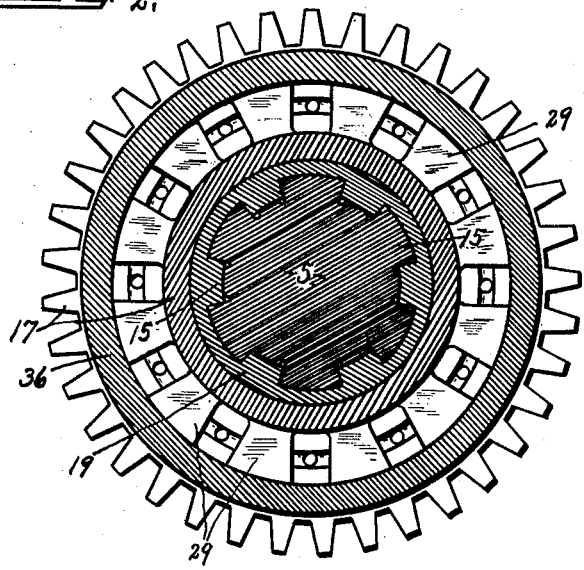
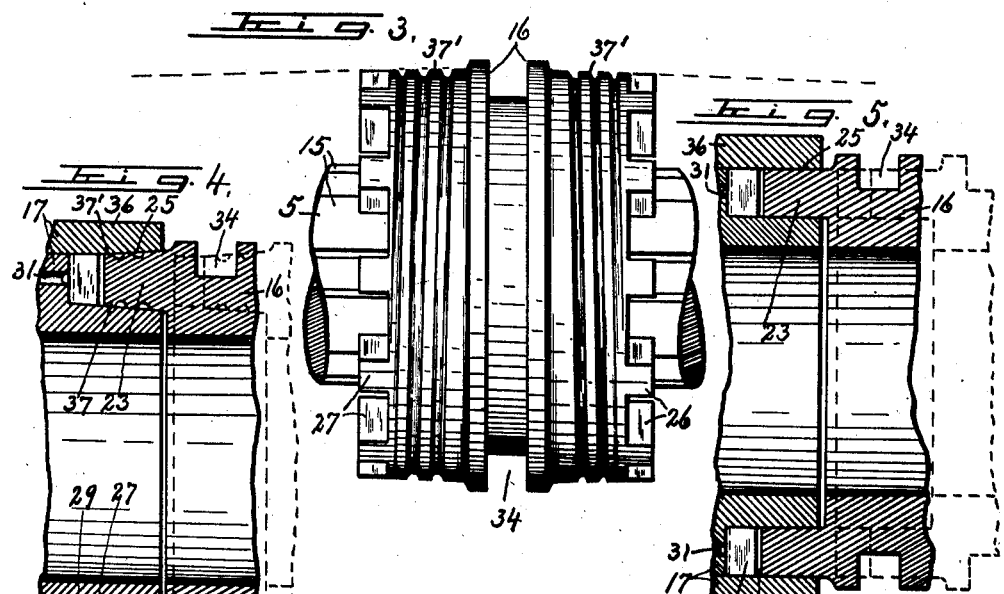
Witness
J. T. Mains
Inventor
C. H. Logue
By Denison & Thompson
Attorneys

Patented Nov. 3, 1931

1,830,744

UNITED STATES PATENT OFFICE

CHARLES H. LOGUE, OF SYRACUSE, NEW YORK, ASSIGNOR TO GENERAL MOTORS CORPORATION, OF DETROIT, MICHIGAN, A CORPORATION OF DELAWARE

VARIABLE SPEED POWER TRANSMITTING MECHANISM

Application filed December 5, 1928. Serial No. 323,994.

This invention relates to a variable speed power transmitting mechanism of the constant mesh gear type which is similar in some respects to that set forth in my pending application Serial No. 301,299, filed August 22, 1928, but it will be obvious that the present invention may be used in other gear transmissions without departing from the spirit thereof.

In this type of gear transmission it is customary to shift a clutch member axially into and out of engagement with opposed co-axial gears and in view of the fact that those gears are frequently rotated at different speeds at the time it is desired to make the shift it results in more or less noisy clashing of the teeth before they can be brought into synchronous speed rotation.

Furthermore, it is customary to assemble these gears and other movable parts associated therewith within a liquid tight casing containing a sufficient quantity of oil or equivalent lubricant to practically envelop the moving parts.

The main object of the present invention is to provide simple and efficient means for automatically establishing uniform speeds of rotation of the clutch member and gears immediately preceding their inter-engagement one with the other for the purpose of reducing to a minimum the difficulties and noise incidental to such inter-engagement, particularly when the clutch member and gears are rotating at different speeds at the time the clutch member is shifted from its neutral position into engagement with either gear for direct or high speed drive and for reduced speed drive forward or reverse.

One of the specific objects is to provide means whereby portions of the lubricant may be trapped or confined between the relatively shiftable elements so that when the latter are brought together the resistance produced by the interposed or trapped lubricant will automatically produce uniform speed rotation of those elements before the engagement of their cooperative clutch members.

Another object is to provide the pockets in which the lubricant is trapped with restricted outlets or bleed-holes to allow the lubricant to gradually pass therethrough and thus permit the inter-engagement of the clutch member teeth with the gears as the relatively rotatable elements are brought into uniform speed rotation.

Another object is to provide one of the rotary elements with means for feeding the lubricant into the traps or pockets as it is rotated and thereby to expedite the establishment of uniform speed rotation of said elements when the latter are brought together.

Other objects and uses relating to specific parts of the transmission gearing will be brought out in the following description.

In the drawings:

Figure 1 is a longitudinal vertical sectional view of a gear transmission embodying the various features of my invention.

Figure 2 is an enlarged transverse sectional view taken in the plane of line 2—2, Figure 1.

Figure 3 is an enlarged face view of the axially movable clutch member and adjacent portion of the driven shaft upon which it is mounted. Figure 4 is an enlarged sectional view through adjacent ends of the clutch member and one of the gears engaged thereby.

Figure 5 is an enlarged sectional view similar to Figure 4, showing a modified form of annular tongue and annular groove on the adjacent ends of the inter-engaging clutch parts.

In order that the invention may be clearly understood I have shown a substantially liquid tight gear case —1— having its opposite ends provided with journal bearings —2— and —3— in which are respectively journaled a driving shaft —4— and a coaxial driven shaft —5—, the inner end of the driven shaft —5— being reduced at —6— and journaled in a corresponding socket in the inner end of the driving shaft —4— to better hold the two shafts in axial alinement.

The gear case —1— contains a sufficient quantity of oil or other lubricant to envelop the gears and other movable parts therein.

A relatively stationary shaft —7— is supported at its ends in the end walls of the casing —1— parallel with and in spaced relation to the coaxial shaft sections —4— and —5— and upon this stationary shaft —7— is mounted a sleeve or rotary tubular shaft —8— carrying a plurality of, in this instance four, gears —9—, —10—, —11— and —12— in axially spaced relation.

The portion of the driving shaft —4— within the gear case is provided with a spur gear —13— and an internal clutch member —14— arranged in axially spaced relation, the clutch member being arranged near the inner end of the shaft —4— some distance beyond the gear —13—, which latter is in constant mesh with the gear —9— for transmitting rotary motion from the driving shaft —4— to the tubular shaft —8—.

The front end of the shaft —4— is adapted to be connected to an internal combustion engine commonly used in motor vehicles but obviously may be connected to any other source of power for driving said shaft.

The portion of the driven shaft —5— within the gear case —1— is provided with lengthwise splines —15— and upon this splined portion is mounted a sliding clutch member —16— and co-axial gears —17— and —18— arranged in axially spaced relation within the gear case —1— for a purpose hereinafter described.

The gear —17— is loosely mounted upon the periphery of a sleeve bearing —19— which is interlocked with the splines —15— of the driven shaft —5— and is held against axial movement by shoulders —20— and —20'— on said shaft.

The gear —17— is held against axial movement on the sleeve —19— by the shoulder —20'— and an additional shoulder —21— on said sleeve, said gear being provided with peripheral gear teeth in constant mesh with the gear —10— for receiving rotary motion from the jack shaft —8—.

The gear ratio between the gears —13— and —9— and also between the gears —10— and —17— is arranged to drive the shaft —5— at intermediate speed when the clutch member —16— is shifted into engagement with the gear —17—.

The clutch member —16— is interlocked with the splines —15— of the shaft —5— to rotate therewith and is also movable axially in opposite directions from a neutral position into and out of engagement with the adjacent ends of the clutch member —14— and gear —17—.

That is, the clutch member —16— is normally in a neutral position between the adjacent ends of the members —14— and —17— and, therefore, out of driving engagement with both of said members and has its opposite ends provided with annular tongues —22— and —23— adapted to enter corresponding annular grooves —24— and —25— in the adjacent ends of the members —14— and —17— respectively, as shown in Figure 1.

The outer ends of the annular tongues —22— and —23— of the sliding clutch member —16— are provided respectively with clutch teeth —26— and —27—, the teeth —26— being movable into and out of engagement with companion clutch teeth —28— on the inner end wall of the annular groove or socket —24— while the clutch teeth —27— are movable into and out of engagement with companion clutch teeth —29— on the inner end wall of the groove or socket —25— of the gear —17— as the clutch member —16— is moved in reverse directions to and from its neutral position.

As previously stated, the movable parts within the case —1— are enveloped in oil or equivalent more or less liquid lubricant and, therefore, the annular grooves —24— and —25— will be substantially filled with such lubricant at all times so that when the clutch member —16— is shifted from its neutral position to cause one or the other of its annular tongues —22— or —23— to enter the corresponding groove —24— or —25—the liquid lubricant will be trapped and compressed in said grooves thereby producing sufficient resistance between the relatively rotating parts to bring them into synchronous speed rotation in the direction of the driving part and this synchronizing of the speeds of rotation of those parts will allow the corresponding teeth of the clutch member to be easily brought into engagement with those of the gears without perceptible clashing or noise.

For example, assuming that the clutch member —16— is in its neutral position and that the shaft —4— is being driven at engine speed in one direction, usually clockwise, thereby transmitting rotary motion to the gear —17— in the same direction, but at a different speed, through the medium of the jack shaft —8— and gears —9— and —10—, then, if it is desired to drive the shaft —5— at the same speed as the gear —17—, the clutch member —16— will be shifted to cause its annular tongue —23— to enter the corresponding socket or groove —25— thereby trapping and compressing the oil in said groove.

This trapping and compression of the oil between the annular tongue —23— and walls of the groove —25— instantly produces sufficient resistance to the relative rotation of said parts to cause the clutch member —16— and shaft —5— to rotate at substantially the same speed as the gear —17— so that as the movement of the clutch member —16— continues in the same direction the teeth —27— of the clutch member —16— will be brought into clutching engagement with their companion teeth —29— on the gear —17— without appreciable clashing or noise for transmitting rotary motion from the gear —17— to the clutch member —16— and thence to the shaft —5—.

On the other hand, if it is desired to drive the shaft —5— at the engine speed the clutch member —16— will be shifted axially to cause its annular tongue —22— to enter the corresponding annular groove —24— in the member —14— thereby trapping and compressing the oil in said groove so that the impingement of the oil between the tongue —22— and walls of the groove will produce sufficient resistance to the relative rotation of the members —14— and —16— to cause the member —16— to be rotated at substantially the same speed as the engine-driven member —14—.

Immediately following this trapping and compression of the oil within the groove —24— the continued movement of the clutch member —16— in the same direction will cause its teeth —26— to be brought into engagement with the companion teeth —28— of the member —14— for transmitting positive rotary motion from the member —14— to the clutch member 16 and thence to the shaft —5—.

Suitable means is provided for relieving the compression of the oil in the grooves —24— and —25— by the corresponding tongues —22— and —23— of the clutch member 16 as the latter is shifted into and out of engagement with the members —14— and —17— respectively and for this purpose the inner end walls of said grooves are provided with restricted outlet passages or bleed holes —30— and —31— respectively, said relief passages being located between the clutch teeth —28— and —29— of the corresponding members —14— and —17—, Figure 1.

The means for shifting the clutch member —16— axially and also the means for driving the shaft —5— at relatively low speed and reverse motion are similar to that set forth in my pending application previously referred to and inasmuch as these elements form no part of my present invention it will be unnecessary to further illustrate or describe the same, except to say that the clutch shifting means may include a sliding rod —32— guided in the upper portion of the gear case —1— and provided with a shifting member —33— adapted to engage in an annular groove —34— in the periphery of the clutch member —16— midway between the ends thereof.

The rod —32— may be shifted endwise by means of a hand lever —38— which is mounted upon the usual standard —39— on the top of the gear case —1—. In order that the clutch teeth —28— and —29— may be more conveniently formed on their respective members —14— and —17— the outer walls —35— and —36— of the grooves —24— and —25— are previously made separate from the remaining portions of said members and rigidly secured thereto in any suitable manner after the teeth —28— and —29— have been formed.

As shown in Figures 1 and 4 the peripheral walls of the grooves —24— and —25— are tapered axially in opposite directions while the inner and outer peripheral walls of the corresponding tongues —22— and —23— are similarly tapered to facilitate the entrance and withdrawal of the tongues into and out from the corresponding grooves and also to effect a more gradual compression of the lubricant between the tongues and peripheral walls of their adjacent grooves whereby the relatively rotating parts are caused to rotate at uniform speeds immediately preceding the engagement of the clutch teeth of the clutch member —16— with their companion teeth of the members —14— and —17—.

As shown in Figures 1, 3 and 4, the inner and outer periphery of the tongues —22— and —23— are provided with spiral threads —37— and —37'— arranged to feed the lubricant surrounding the same toward and into the corresponding grooves —24— and —25— and thereby to facilitate and expedite the compression of the oil within said grooves as the clutch member —16— is shifted into and out of engagement with either of the members —14— and —17—.

In Figure 5 I have shown the adjacent ends of the members —16— and —17— as provided with slightly modified forms of tongue and groove in which the inner and outer peripheral walls of the tongue and also the inner and outer peripheral walls of the groove are substantially parallel and complementary instead of being tapered as shown in Figures 1, 3 and 4, the spiral threads being omitted.

Although I have shown this sliding clutch as applied to motor vehicles it is evident that it may be used for many other purposes and that various changes may be made in the detail construction without departing from the spirit of this invention.

What I claim is:

1. In variable speed power transmission, coaxial relatively rotatable elements relatively movable axially into and out of engagement with each other and having their adjacent ends provided respectively with an annular concentric fluid-containing groove and an annular concentric boss arranged to enter and compress the fluid in the groove as the elements are brought together for equalizing the speeds of rotation of both elements, means for shifting the axially movable element, and means for driving one of said elements, said boss having peripheral threads arranged to feed the fluid into the groove as the elements are relatively rotated.

2. In a power transmitting mechanism, coaxial relatively rotatable driving and driven elements relatively movable axially and having adjacent ends provided respectively with a coaxial fluid-containing socket and complementary coaxial boss, and means for moving one of said elements axially toward the other element for forcing the boss into the socket and thereby trapping the fluid therein to synchronize the speed of rotation of the driven element with that of the driving element one of said elements having a screw thread arranged to compress the fluid in the socket as the elements are relatively rotated.

In witness whereof I have hereunto set my hand this 3d day of December, 1928.

CHARLES H. LOGUE.